(12) United States Patent
Shahin (10) Patent No.: US 12,305,724 B2
(45) Date of Patent: May 20, 2025

(54) BRAKE PAD ASSEMBLY FOR A DISK BRAKE SYSTEM AND DISK BRAKE SYSTEM

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 329 days.

(21) Appl. No.: 18/052,210

(22) Filed: Nov. 3, 2022

(65) Prior Publication Data

US 2023/0141199 A1    May 11, 2023

(30) Foreign Application Priority Data

Nov. 5, 2021   (DE) .......................... 102021212499.2

(51) Int. Cl.
    F16D 65/097    (2006.01)
    F16D 55/225    (2006.01)
    F16D 65/00     (2006.01)

(52) U.S. Cl.
    CPC ....... *F16D 65/0006* (2013.01); *F16D 55/225* (2013.01); *F16D 65/0971* (2013.01); *F16D 2200/0056* (2013.01)

(58) Field of Classification Search
    CPC ............. F16D 65/0006; F16D 65/0971; F16D 55/225; F16D 2200/0056
    (Continued)

(56) References Cited

U.S. PATENT DOCUMENTS 5,975,252 A    11/1999   Suzuki
6,170,620 B1    1/2001   Akita
(Continued)

FOREIGN PATENT DOCUMENTS

EP    0926379 A2    6/1999
JP    H09-151970 A  5/1997
(Continued)

OTHER PUBLICATIONS

DE Office action.

*Primary Examiner* — Christopher P Schwartz
(74) *Attorney, Agent, or Firm* — Harvest IP Law, LLP (57) ABSTRACT

The application relates to a brake pad assembly (2) for a disk brake system and to a disk brake system. The disk brake system has a brake piston (11) and a caliper finger (20) movably coupled to the brake piston (11). The brake pad assembly (2) comprises a back plate (4) having a front side for facing a brake disk (1) of the disk brake system and a back side (6), a friction layer (3) arranged at the front side of the back plate (4) for contacting a friction surface of the brake disk (1), and a shim (5) arranged on the back side (6) of the back plate (4). The shim (5) comprises a back surface (12) having a top edge (14) and first and second side edges (16, 17). Further, the back surface (12) of the shim (5) contains a pressure region (13) that is configured to be pushed on by the brake piston (11) or by the caliper finger (20) upon brake application. The shim (5) further comprises a plurality of cutouts (19, 19', 19") for noise reduction. The plurality of cutouts (19, 19', 19") is arranged at least partly between the pressure region (13) of the back surface (12) of the shim (5) and the top edge (14) of the back surface (12) of the shim (5). Additionally or alternatively, the plurality of cutouts (19, 19', 19") is arranged at least partly between the pressure region (13) of the back surface (12) of the shim (5)

(Continued)

and at least one of the first side edge (16) and the second side edge (17) of the back surface (12) of the shim (5).

12 Claims, 5 Drawing Sheets

(58) Field of Classification Search
USPC .............................. 188/250 B, 250 E, 250 G
See application file for complete search history.

(56) References Cited

U.S. PATENT DOCUMENTS

| | | |
|---|---|---|
| 2015/0260243 A1 | 9/2015 | Izumihara |
| 2016/0146276 A1* | 5/2016 | Kobayashi .......... F16D 65/0971 |
| | | 188/250 F |
| 2023/0167865 A1* | 6/2023 | Shahin .................. B32B 15/043 |
| | | 188/72.1 |

FOREIGN PATENT DOCUMENTS

| | | | | |
|---|---|---|---|---|
| JP | 2009097600 A | * | 5/2009 | ........... F16D 65/095 |
| KR | 10-1998-085336 A | | 12/1998 | |
| KR | 10-1675757 B1 | | 11/2016 | |

\* cited by examiner

BRAKE PAD ASSEMBLY FOR A DISK BRAKE SYSTEM AND DISK BRAKE SYSTEM

The application relates to a brake pad assembly for a disk brake system and to a disk brake system.

Brake Engineers are in search for robust solutions to suppress squeal noises (tonal loud noises typically appearing in frequencies between 1000 and 16000 Hz) in disk brake systems. Different solutions are known to improve the noise, vibration, and harshness (NVH) characteristics, including a steel shim glued to a back side of a back plate of a brake pad assembly, different chamfers on a pad of the brake pad assembly, slots on pad surfaces contacting the disk, modifications of friction material of the brake pads, and an underlayer connecting the friction material to the back plate. The main effect of the shim is to decouple system modes from each other. While these solutions can help improve the squeal noise characteristics, in most cases these solutions work well only under specific braking conditions (low or high frequency, cold or warm temperature). Prior art can be found, e.g., in document DE 197 06 122 A1.

In view of the above-mentioned aspects, it is an object of the present invention to provide an improved brake pad assembly for a disk brake system. In particular, it is an object of the application to provide a compact and robust brake pad assembly, which reliably suppresses squeal noises over a wide range of braking conditions. In addition, it is an object of the application to provide an improved disk brake system having these advantages.

This objective is achieved by a brake pad assembly for a disk brake system comprising the features of claim 1. Optional further features and further developments will become apparent from the dependent claims and the detailed description in conjunction with the accompanying figures.

The proposed brake pad assembly for a disk brake system has a brake piston and a caliper finger movably coupled to the brake piston. The brake pad assembly comprises a back plate having a front side for facing a brake disk of the disk brake system and a back side, a friction layer arranged at the front side of the back plate for contacting a friction surface of the brake disk, and a shim arranged on the back side of the back plate. The shim comprises a back surface having a top edge and first and second side edges. Further, the back surface of the shim contains a pressure region that is configured to be pushed on by the brake piston or by the caliper finger upon brake application. The shim further comprises a plurality of cutouts for noise reduction. The plurality of cutouts is arranged at least partly between the pressure region of the back surface of the shim and the top edge of the back surface of the shim. Additionally or alternatively, the plurality of cutouts is arranged at least partly between the pressure region of the back surface of the shim and at least one of the first side edge and the second side edge of the back surface of the shim.

The proposed brake pad assembly improves the reduction of noises, in particular squeal noises by making use of a beneficial arrangement of the plurality of cutouts of the shim. The brake pad assembly achieves a higher damping effect based on controlled acoustic wave transmission within a body and structure of the brake pad assembly and also reduces transmission of acoustic waves from the structure to the surrounding through airborne sound. Due to the arrangement of the plurality of cutouts a sound path may be controlled and high pressure amplitudes can be reduced. Beneficially, the proposed arrangement of the plurality of cutouts of the shim supports structure noise to be damped and squeal sound energy to be dissipated. In this manner, the proposed invention achieves an improved global damping (reduction of sound pressure level) among a wide frequency scale by dissipation of an acoustic path through the structure and the surface of the shim. The proposed arrangement of cutouts is suitable to improve a homogenous distribution of force flow lines starting from the pressure region to the edges and other connection areas of the shim and thereby achieves a more homogeneous pressure distribution enabling an improved noise reduction. The reason is that it was found that in realistic brake scenarios, the force transmission within the shim upon brake application tends to be from the pressure region toward the top and first and second side edges of the shim due to tangential pressure components.

The application further relates to a disk brake system comprising the brake pad assembly as described above or below. The disk brake system may further comprise the brake piston and the caliper finger movably coupled to the brake piston. In particular, the disk brake system may comprise another brake pad assembly having the features of the brake pad assembly described above or below. The brake pad assembly and the other brake pad assembly may each be mounted between one of the piston and the brake disk and the caliper finger and the brake disk.

In some embodiments, the plurality of cutouts is arranged at least partly in a region of force transmission between the pressure region of the back surface of the shim and an edge surface of the back surface of the shim upon brake application. The edge surface of the back surface of the shim typically is typically delimited by one of the top edge and the first and second side edges of the back surface of the shim. In this manner, the noise reduction may be improved by providing a homogeneous force distribution upon brake application. In preferred embodiments, the plurality of cutouts is entirely arranged between the pressure region of the back surface of the shim and the top edge of the back surface of the shim and/or between the pressure region of the back surface of the shim and at least one of the first side edge and the second side edge of the back surface of the shim. Further, in some embodiments, the shim comprises no cutouts other than the plurality of cutouts.

Typically, the top edge of the back surface of the shim delimits the shim in a radial direction as defined with respect to the brake disk. The first side edge and the second side edge typically delimit the back surface of the shim in leading and trailing tangential directions, respectively.

In further embodiments, the plurality of cutouts is at least partly arranged between the pressure region of the back surface of the shim and the top edge of the back surface of the shim as well as at least partly between the pressure region of the back surface of the shim and at least one of the first side edge and the second side edge of the back surface of the shim. In another embodiment that further improves noise reduction, the plurality of cutouts is partly arranged between the pressure region of the back surface of the shim and the first side edge of the back surface of the shim as well as partly between the pressure region of the back surface of the shim and the second side edge of the back surface of the shim. The plurality of cutouts may at least partly be arranged in a radial direction of, e.g., above, the pressure region, in particular toward the top edge of the back surface of the shim. In this manner, force transmission upon brake application toward the top edge may be efficiently suppressed to enable a more homogeneous pressure distribution and to improve noise reduction.

In some embodiments, the pressure region of the back surface of the shim is configured to be pushed on by the brake piston upon brake application. The pressure region may have a curved upper edge. The circular upper edge of the pressure region may result from a ring-shaped piston surface.

In preferred embodiments, at least a portion, in particular an entirety, of the plurality of cutouts forms a pattern corresponding to a circular segment. The circular segment span across an angular range of at least 30, preferably at least 60, degrees. The circular segment typically has a radius of curvature that is larger than a radius of curvature of the curved upper edge of the pressure region. In this manner, noise reduction may be improved by providing a curved arrangement of the plurality of holes around a top portion of the pressure surface.

In other embodiments, the pressure region of the back surface of the shim is configured to be pushed on by the caliper finger upon brake application. A part of the plurality of cutouts may be arranged on an essentially straight line between the pressure region and the top edge of the back surface of the shim. Another part of the plurality of cutouts may be arranged on another essentially straight line between the pressure region and at least one of the first side edge and the second side edge of the back surface of the shim. In this manner, force transmission may be improved for the case of the caliper finger pushing onto the brake pad assembly for improved noise reduction. In this case, the pressure region typically comprises a left pressure region and a right pressure region, which are separate from one another. The pressure regions are typically a result of the shape of the caliper finger having left and right finger faces. Typically, a portion of the plurality of cutouts is arranged between the left pressure region and the first side edge. Preferably, a portion of the plurality of cutouts is also arranged between the left pressure region and the top edge. A portion of another plurality of cutouts may be arranged between the right pressure region and the second edge and another portion of the other plurality of cutouts may be arranged between the right pressure region and the top edge for improved noise reduction properties on the caliper finger side.

In most embodiments, the shim comprises a metal sheet. The plurality of cutouts may be formed in the metal sheet. The metal sheet may be made of, e.g., steel, copper, aluminium or plastic. Further, the shim may comprise a rubber layer arranged on a back side of the shim. The plurality of cutouts may also be formed in the rubber layer.

For effective noise reduction, the plurality of cutouts may contain at least three cutouts, in particular at least five cutouts. The plurality of cutouts typically contains at least one through hole. Further, the plurality of cutouts may contain at least one blind hole. The plurality of cutouts may contain or be formed by a plurality of elongated holes and/or round holes. For example, the plurality of cutouts may contain through holes and grooves. In preferred embodiments, the cutouts of the plurality of cutouts are hollow and/or not filled by a solid material.

In most embodiments, the plurality of cutouts has rounded corners. For example, an edge formed between the front or back surface of the shim and each one of the plurality of cutouts may have a radius of curvature of at least 5 mm, in particular at least 10 mm. In this manner, damage resulting from a relative motion of the components (e.g., brake piston, caliper finger, and shim) can be avoided.

The cutouts may be produced in the same manufacturing step (cutting, punching) in which the shim is produced. In this way, production costs can be reduced.

Exemplary embodiments will be described in conjunction with the following figures.

Figure 1:
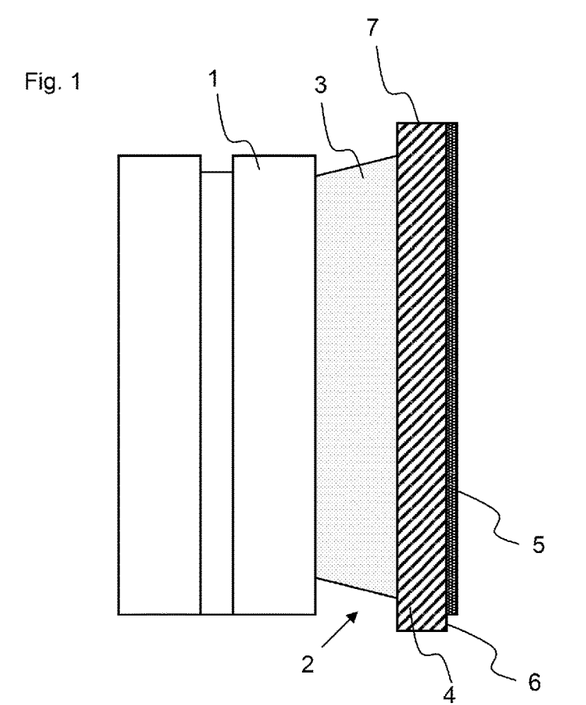
FIG. 1 shows a schematic cross sectional illustration of a brake pad assembly and a brake disk.

FIG. 1 shows a brake disk 1 of a of a disk brake system for a vehicle. The disk brake system may comprise a caliper housing, a caliper finger and a brake piston. The disk brake system further comprises a brake pad assembly 2, which may be attached to the caliper finger and/or to the piston. The brake pad assembly 2 has a friction layer 3, which is pushed against a friction surface of the brake disk 1 upon hydraulic or electric actuation of the disk brake system. The friction layer 3 contains a material that shows a good stopping performance and heat transfer when engaging with the brake disk 1. The friction layer 3 is attached to a front side of a back plate 4, which provides structural stability to the brake pad assembly 2. The back plate 4 is typically held by the piston or the caliper finger such that the brake pad assembly 2 is mounted to the piston or caliper finger via the back plate 4. In most embodiments, the back plate 4 is made of a metal, in particular steel. A thickness of the back plate 4 may be at least 3 mm and/or at most 8 mm. The friction layer 3 can have a thickness of at least 8 mm and/or at most 15 mm, for example. The material of the friction layer 3 can for instance comprise at least one of copper, iron sulphide, graphite, zinc powder, basalt, calcium carbonate, tin sulphide, zinc aluminium, phenolic resin, rubber dust and mineral fiber. These materials show good stopping performance and heat transfer when engaging with the brake disk.

A shim 5 is mounted to a back side 6 of the back plate 4. The shim 5 is glued to the back side 6 of the back plate 4 using an adhesive layer, but may also be formed as a clip-on shim having resilient clips that are configured to contact and engage with an edge surface 7 of the back plate 4 to attach the shim 5 to the back plate 4. The resilient clips may be formed by folded protrusions in an edge portion of the shim 5.

Figure 2:
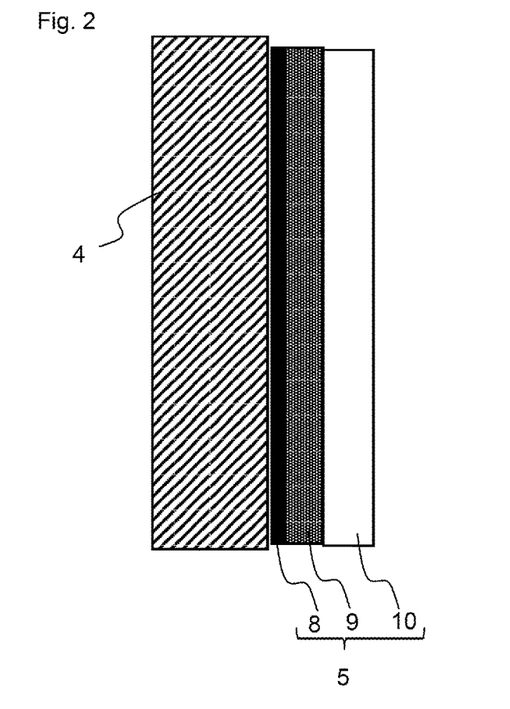
FIG. 2 shows a more detailed view of the brake pad assembly, FIGS. 3(a) and (b) show schematic views of the brake pad assembly and a brake piston.

FIG. 2 shows the back plate 4 and the shim 5 in more detail. Corresponding and reoccurring features shown in the different figures are denoted using the same reference numerals. The shim 5 comprises a layered structure having an adhesive layer 8 for fixing the shim 5 to the back side 6 of the back plate 4, a metal sheet 9, and a rubber layer 10. The metal sheet 9 may be formed by a steel, copper, aluminium or plastic layer. The rubber layer 10 covers a back side of the metal sheet 9. A total thickness of the shim 5 may, e.g., amount to at least 0.2 mm and/or at most 2 mm.

Figure 3A:
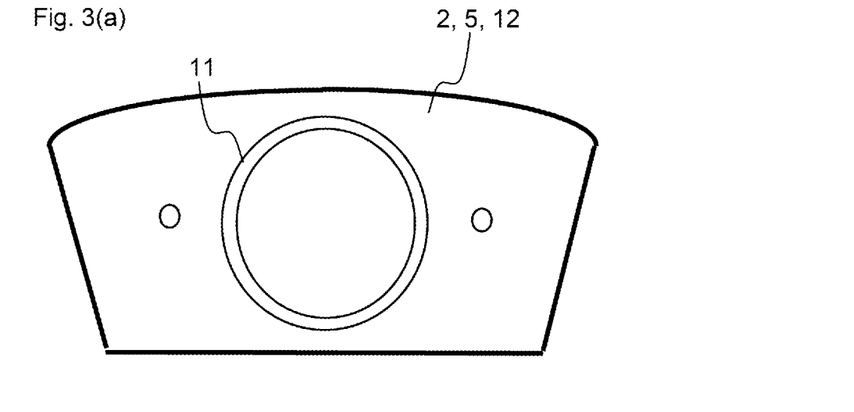
Figure 3B:
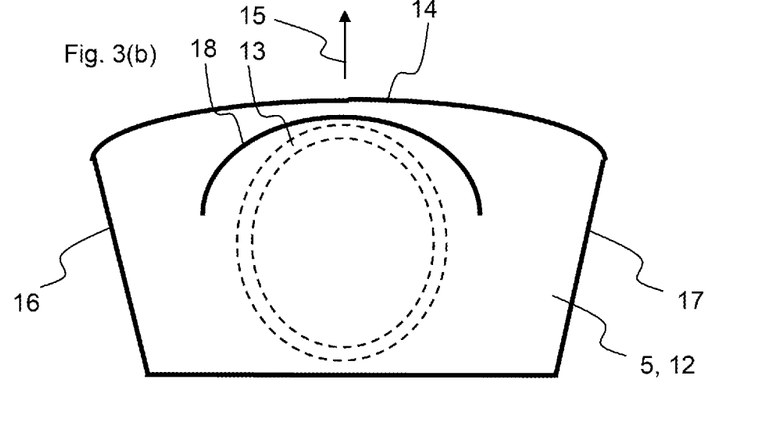

FIG. 3(a) shows the brake pad assembly 2 and the brake piston 11 of the disk brake system as viewed from the back, i.e., toward the brake disk 1. The brake piston 11 is configured to push against a back surface 12 of the shim 5. The brake piston 11 has a ring-shaped front surface, which leads to a ring-shaped pressure region 13, i.e., a ring-shaped region of the back surface 12 of the shim 5 that is exposed to an axial pressure exerted by the brake piston 11, as shown in FIG. 3(b). FIG. 3(b) does not show the brake piston 11. The back surface 12 of the shim 5 has a top edge 14, which delimits the shim 5 in the upward direction. The upward direction is a radial direction 15. According to the depiction of the figures, the axis of rotation (not shown) of the brake disk 1 would be arranged below the brake pad assembly 2, i.e., toward the bottom in the figures (in a direction opposite the radial direction 15). The back surface 12 of the shim 5 further has a first side edge 16, which is a leading edge on the left in the figures, and a second side edge 17, which is a trailing edge on the right.

A line 18 in the shape of a circular segment, as shown in FIG. 3(b), illustrates a region for arrangement of a plurality of cutouts of the shim. This region is intended to yield a preferred noise cancellation effect of the plurality of cutouts. The region is arranged between the pressure region 13 and the top edge 14 as well as between the pressure region and the first and second side edges 16, 17. The plurality of cutouts is arranged in this region, i.e., in the radial direction (upward in the figure) from the pressure region 13 and in the tangential direction (to the left and right in the figure) from the pressure region 13.

Thereby, a damping ratio of shim 5 is efficiently improved by improvement of a structural damping besides material damping. The cutouts 19, 19', 19" are not homogeneously distributed across the shim 5, but in the described systematic way so that an optimal decrease of a maximal pressure amplitude is achieved and such that the force flow in realistic braking scenarios is evenly transmitted and distributed over a surface are of the shim. Also the described distribution of the cutouts is suitable for minimizing a friction between contacting faces of the brake pad assembly 2 and supports a conversion of hard contact to soft contact properties. A position, shape and number of holes is chosen to support decoupling of vibration between contacting components, to reduce structure noises, and to support dissipation of airborne noises generated by vibrating parts.

Figure 4A:
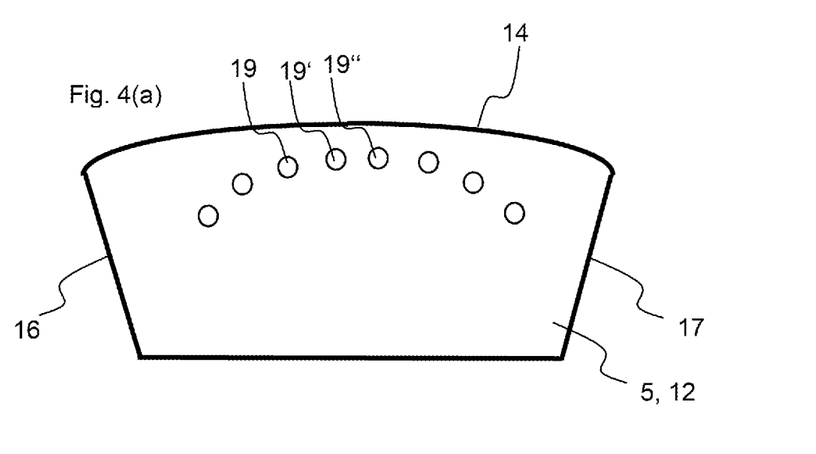
FIGS. 4(a) to (d) show different embodiments of the brake pad assembly, FIGS. 5(a) and (b) show schematic views of a brake pad assembly according to another embodiment and a caliper finger.
Figure 4B:
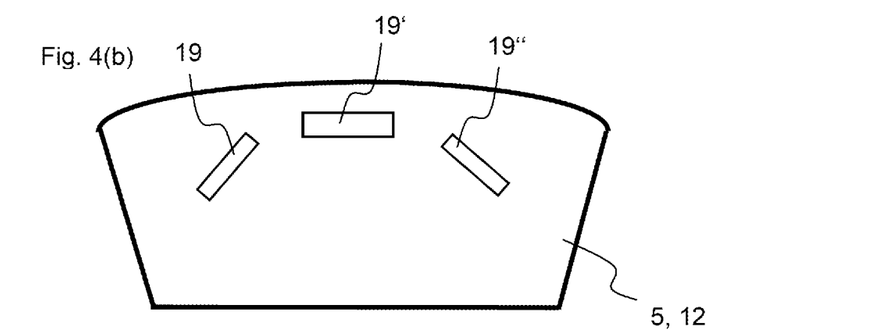
Figure 4C:
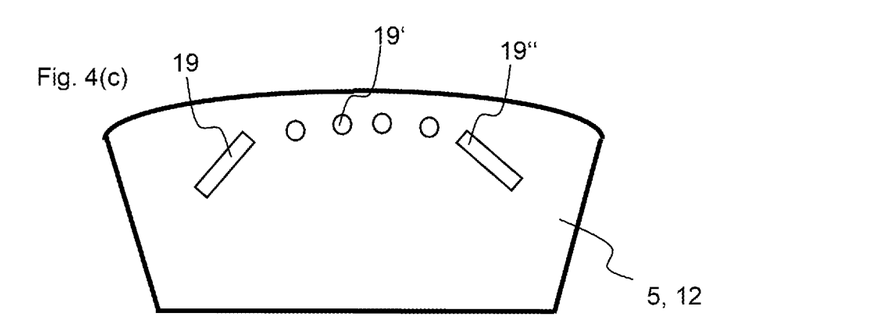
Figure 4D:
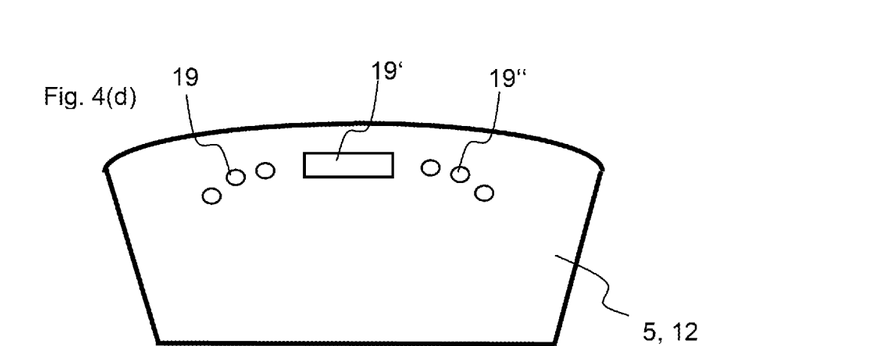

FIG. 4(a) illustrates the position of the plurality of cut-outs, which corresponds to the region indicated by the line 18 in FIG. 3(b). The plurality of cut-outs comprises a number of individual cutouts (each depicted as a circle in FIG. 4(a)). As an example, three of the individual cutouts are denoted using reference numerals 19, 19', and 19". The individual cutouts can be formed by round holes as shown in FIG. 4(a) or by elongated holes as shown in FIG. 4(b) (depicted as rectangular lines). The cutouts may be blind holes (e.g., blind bores or grooves) or through holes (e.g., through bores or slots). The plurality of cutouts may as well be formed by a combination of round holes and elongated holes, as shown in FIGS. 4(c) and (d), arranged in the region illustrated by the line 18 in FIG. 3(b). The plurality of cutouts is formed in the metal sheet 9 of the shim 5 and is typically hollow and not filled by a solid material. The plurality of cutouts may also be formed in all layers of the shim 5, i.e. also in the adhesive layer 8 and in the rubber layer 10.

Figure 5A:
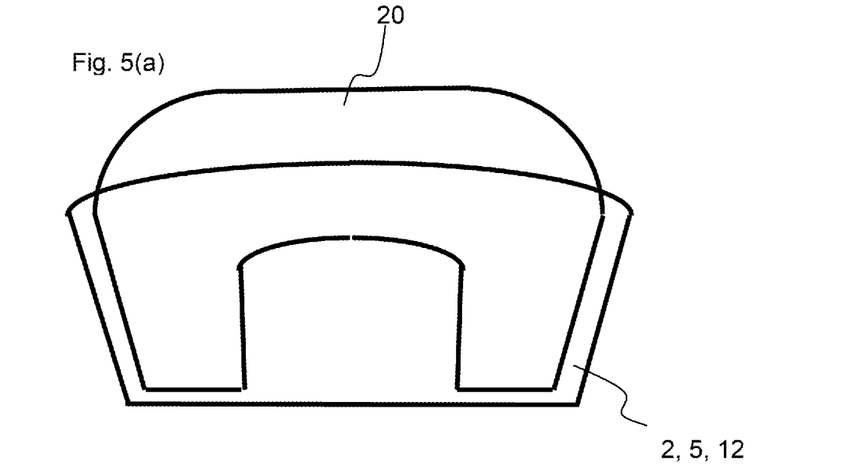
Figure 5B:
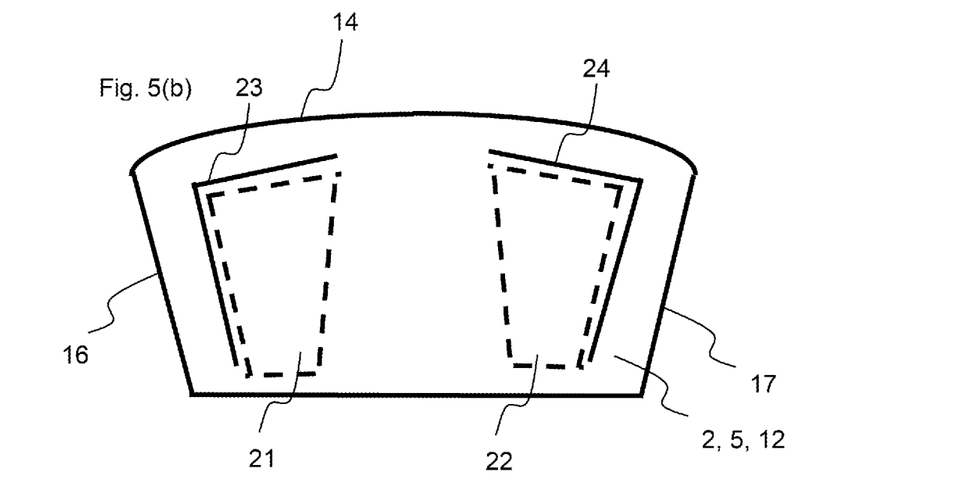
Figure 6A:
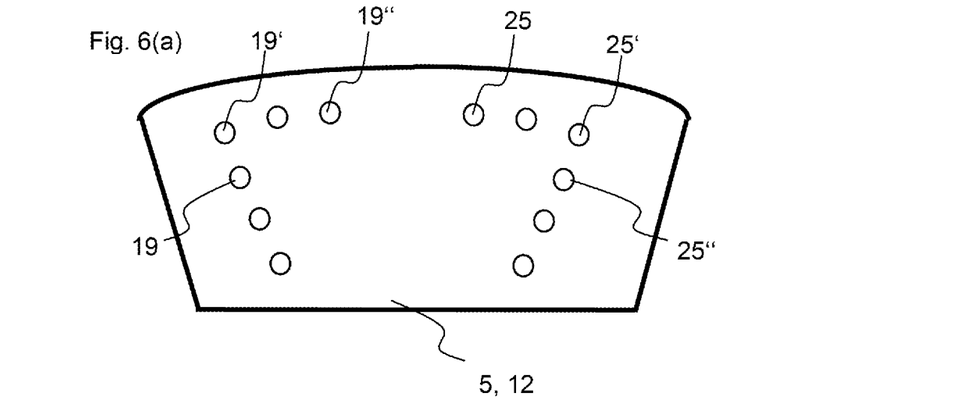
FIGS. 6(a) to (d) show further embodiments of the brake pad assembly.
Figure 6B:
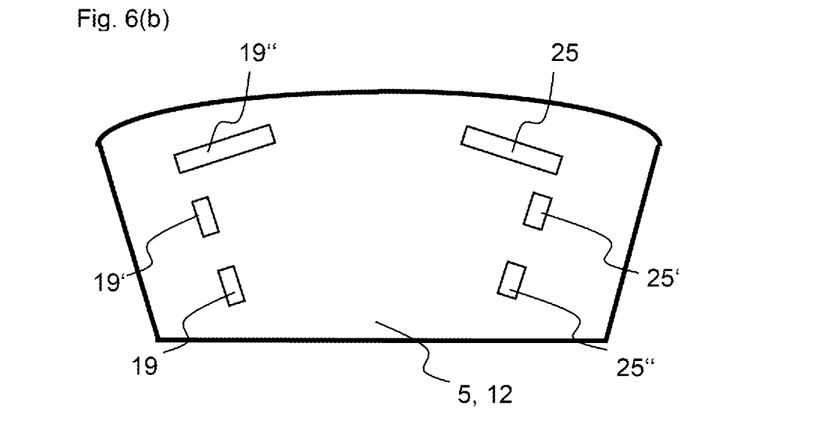
Figure 6C:
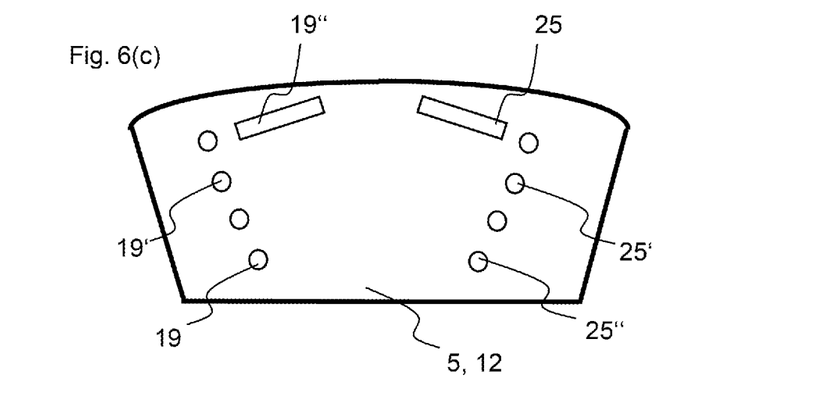
Figure 6D:
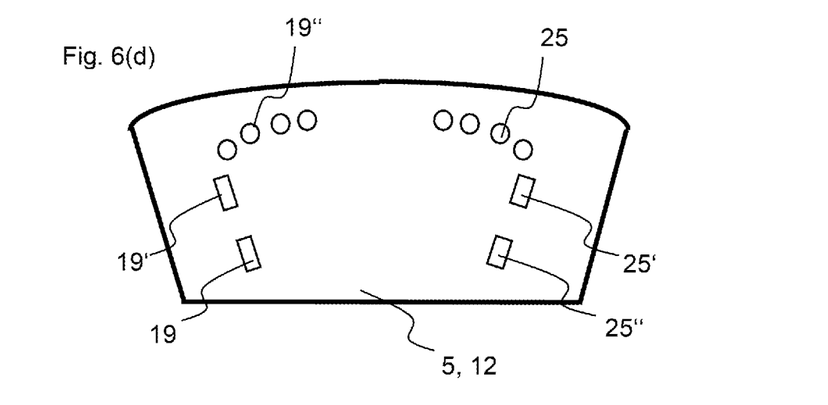

In another embodiment, the brake pad assembly 2 may be intended to be arranged on a caliper finger side of the brake system. As shown in FIG. 5(a), the brake system may comprise the caliper finger 20 (as viewed from the back, i.e., toward the brake disk 1, in the figure). The caliper finger 20 is configured to push against a back surface 12 of the shim 5 when the brake is applied. The caliper finger 20 is shown to exert axial pressure on the brake pad assembly 2 in the pressure region 13, which in this case comprises a left pressure region 21 and a right pressure region 22, as shown in FIG. 5(b). Lines denoted by reference signs 23 and 24 indicate the positions of the plurality of cutouts 19, 19', 19" for preferred noise reduction. In this case a part of the plurality of cutouts 19, 19', 19" is arranged on an essentially straight line between the left pressure region 21 and the top edge 14 of the back surface 12 of the shim 5, and another part of the plurality of cutouts 19, 19', 19" is arranged on another essentially straight line between the left pressure region 21 and the first side edge 16 of the back surface 12 of the shim 5. Another plurality of cutouts 25, 25', 25" is arranged in corresponding positions between the right pressure region 22 and the top and second side edge 14, 17. As it was the case for the embodiment of the brake pad assembly 2 intended for use on the piston side, the preferred position of the plurality of cutouts is between the pressure regions 21, 22 and the top edge 14, i.e. above the pressure regions, as well as between the pressure regions 21, 22 and the first and second side edges 16, 17, i.e. respectively to the left and right of the pressure regions. As further shown in FIGS. 6(a) to (d), the plurality of cutouts 19, 19', 19" can be formed by a combination of round holes and elongated holes as explained above.

Features of the different embodiments which are merely disclosed in the exemplary embodiments may be combined with one another and may also be claimed individually.

LIST OF REFERENCE NUMERALS

1 Brake disk
2 Brake pad assembly
3 Friction layer
4 Back plate
5 Shim
6 Back side of back plate
7 Edge surface of back plate
8 Adhesive layer
9 Metal sheet
10 Rubber layer
11 Brake piston
12 Back surface of shim
13 Pressure region
14 Top edge of back surface of shim
15 Radial direction
16 First side edge of back surface of shim
17 Second side edge of back surface of shim
18 Line illustrating region for arrangement of plurality of cutouts
19, 19', 19" Plurality of cutouts
20 Caliper finger
21 Left pressure region
22 Right pressure region
23, 24 Lines indicating positions of plurality of cutouts
25, 25', 25" Plurality of cutouts

The invention claimed is:
1. A brake pad assembly (2) for a disk brake system having a brake piston (11) and a caliper finger (20) movably coupled to the brake piston (11), the brake pad assembly (2) comprising
a back plate (4) having a front side for facing a brake disk (1) of the disk brake system and a back side (6),
a friction layer (3) arranged at the front side of the back plate (4) for contacting a friction surface of the brake disk (1), and a shim (5) arranged on the back side (6) of the back plate (4), wherein the shim (5) comprises a back surface (12) having a top edge (14) and first and second side edges (16,17), wherein the back surface (12) of the shim (5) contains a pressure region (13) that is configured to be pushed on by the brake piston (11) upon brake application, and the pressure region (13) has a circular upper edge, and characterized in that the shim (5) comprises a plurality of cutouts (19,19', 19") formed on the back surface (12) for noise reduction, wherein the plurality of cutouts (19,19', 19") is arranged at least partly between the pressure region (13) of the back surface (12) of the shim (5) and the top edge (14) of the back surface (12) of the shim (5) and/or wherein the plurality of cutouts (19,19', 19") is arranged at least partly between the pressure region (13) of the back surface (12) of the shim (5) and at least one of the first side edge (16) and the second side edge (17) of the back surface (12) of the shim (5), wherein at least a portion of the plurality of cutouts (19,19',19") forms a pattern corresponding to a circular segment.

2. The brake pad assembly (2) of claim 1, characterized in that the shim (5) comprises a metal sheet (9), wherein the plurality of cutouts (19,19', 19") is formed in the metal sheet (9).

3. The brake pad assembly (2) of claim 2, characterized in that the shim (5) comprises a rubber layer (10) arranged on a back side of the shim (5), wherein the plurality of cutouts (19,19', 19") is also formed in the rubber layer (10).

4. The brake pad assembly (2) of claim 3, characterized in that the plurality of cutouts (19,19', 19") contains at least three cutouts (19,19', 19").

5. The brake pad assembly (2) of claim 4, characterized in that the plurality of cutouts (19,19', 19") has rounded corners.

6. The brake pad assembly (2) of claim 1, characterized in that the plurality of cutouts (19,19', 19") contains at least one through hole.

7. The brake pad assembly (2) of claim 6, characterized in that the plurality of cutouts (19,19', 19") contains at least one blind hole.

8. The brake pad assembly (2) of claim 1, characterized in that the plurality of cutouts (19,19', 19") is arranged at least partly in a region of force transmission between the pressure region (13) of the back surface (12) of the shim (5) and an edge surface of the back surface (12) of the shim (5) upon brake application.

9. The brake pad assembly (2) of claim 1, characterized in that the plurality of cutouts (19,19', 19") is at least partly arranged in a radial direction (15) of the pressure region (13) toward the top edge (14) of the back surface (12) of the shim (5).

10. The brake pad assembly (2) of claim 1, characterized in that the plurality of cutouts (19,19', 19") is partly arranged between the pressure region (13) of the back surface (12) of the shim (5) and the first side edge (16) of the back surface (12) of the shim (5) as well as partly between the pressure region (13) of the back surface (12) of the shim (5) and the second side edge (17) of the back surface (12) of the shim (5).

11. A disk brake system comprising a brake pad assembly (2) of claim 1 and further comprising the brake piston (11) and the caliper finger (20) movably coupled to the brake piston (11).

12. A brake pad assembly (2) for a disk brake system having a brake piston (11) and a caliper finger (20) movably coupled to the brake piston (11), the brake pad assembly (2) comprising a back plate (4) having a front side for facing a brake disk (1) of the disk rake system and a back side (6), a friction layer (3) arranged at the front side of the back plate (4) for contacting a friction surface of the brake disk (1), and a shim (5) arranged on the back side (6) of the back plate (4), wherein the shim (5) comprises a back surface (12) having a top edge (14) and first and second side edges (16, 17), wherein the back surface (12) of the shin (5) contains a pressure region (21, 22) that is configured to be pushed on by the caliper finger (20) upon brake application, and characterized in that the shim (5) comprises a plurality of cutouts (19,19', 19") formed on the back surface (12) for noise reduction, wherein the plurality of cutouts (19,19',19") is arranged at least partly between the pressure region (21, 22) of the back surface (12) of the shim (5) and the top edge (14) of the back surface (12) of the shim (5), and a part of the plurality of cutouts (19,19',19") is arranged on a straight line, wherein the plurality of cutouts (19,19',19") is arranged at least partly between the pressure region (21, 22) of the back surface (12) of the shim (5) and at least one of the first side edge (16) and the second side edge (17) of the back surface (12) of the shim (5), and another part of the plurality of cutouts (19,19', 19") is arranged on another straight line.

* * * * *